(No Model.) 2 Sheets—Sheet 1.

D. R. GREEN & F. R. FISHER.
GRINDING MILL.

No. 437,756. Patented Oct. 7, 1890.

WITNESSES
T. W. Fowler,
Chapman Fowler

INVENTORS
David R. Green,
Frank R. Fisher,
by A. H. Evans & Co
Attorneys

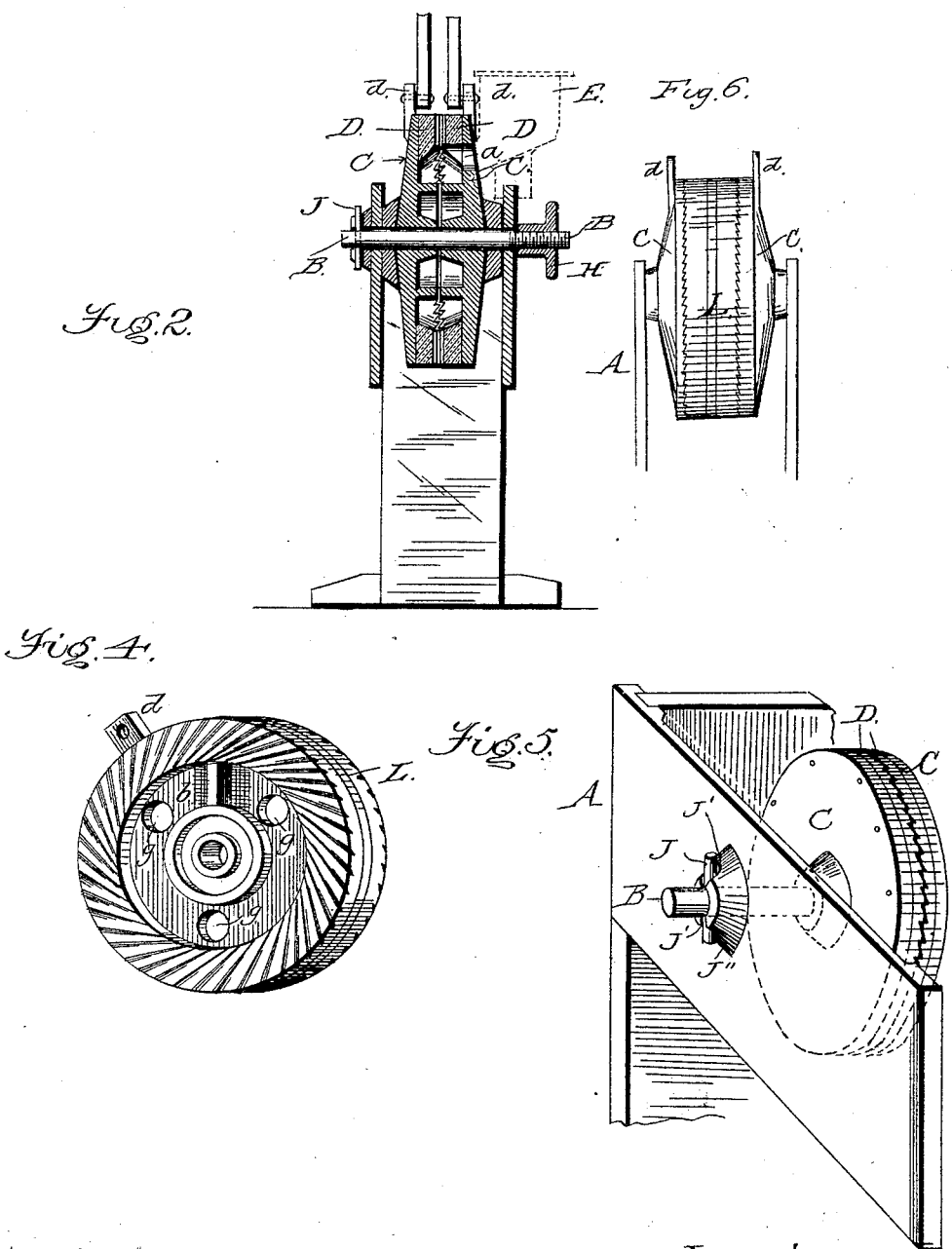

UNITED STATES PATENT OFFICE.

DAVID R. GREEN AND FRANK R. FISHER, OF WATERLOO, IOWA.

GRINDING-MILL.

SPECIFICATION forming part of Letters Patent No. 437,756, dated October 7, 1890.

Application filed April 26, 1890. Serial No. 349,586. (No model.)

*To all whom it may concern:*

Be it known that we, DAVID R. GREEN and FRANK R. FISHER, citizens of the United States, residing at Waterloo, in the county of Black Hawk and State of Iowa, have invented certain new and useful Improvements in Grinding-Mills, of which the following is a full and clear description, reference being had to the accompanying drawings, forming part of this specification, in which—

Figure 1:
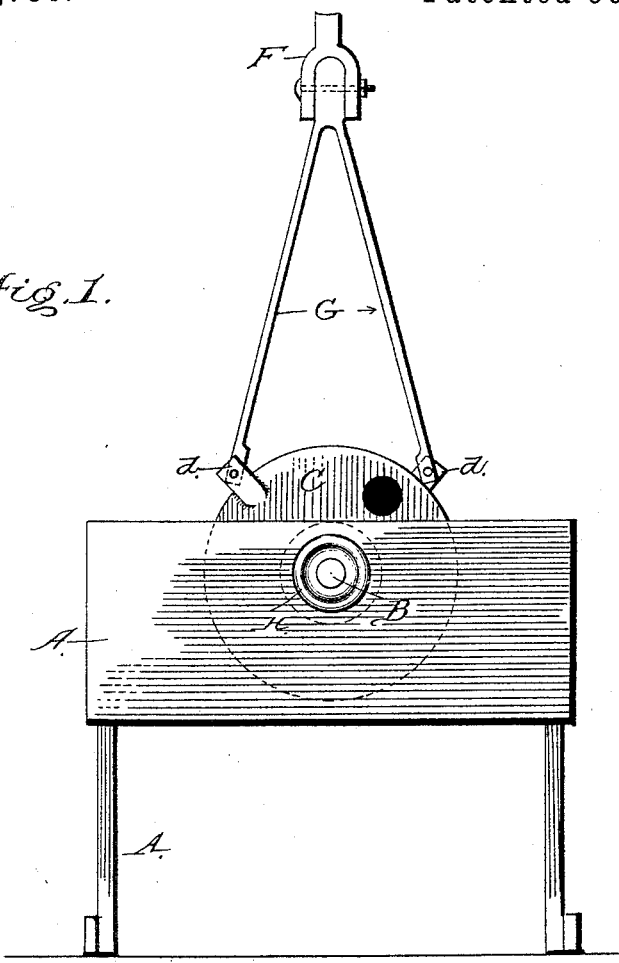
Figure 3:
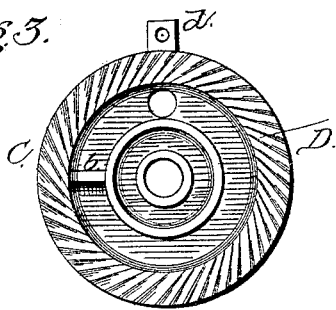

Figure 1 represents a perspective view of a grinding-mill embodying our invention. Fig. 2 is a vertical cross-sectional view of the same. Fig. 3 is a detail showing the inner face of one of the grinding-disks. Fig. 4 illustrates a disk of modified form. Fig. 5 is a broken perspective view showing a portion of the frame A, the grinding-disks, and the break-pin. Fig. 6 is a detail showing the double disk of Fig. 4 in position between the disks or plates C.

Our invention relates to certain improvements in grinding-mills; and it consists in the constructions and combinations of devices which we shall hereinafter fully describe and claim.

In the accompanying drawings, A represents any desired form of frame, within the upper portion of which is mounted a shaft B, and on said shaft, between the inner sides of the frame, are mounted disks or plates C, to the inner surfaces of which the grinding-disks D are bolted or otherwise secured and have their adjoining faces furrowed in reverse lines to effect the grinding of the grain as it is fed between the disk D from a suitable hopper E through an opening $a$ in the side of one of the disks C. In addition to its face being furrowed in the usual manner, each grinding-disk is provided with a lug or radial bar $b$, which serves as a means for breaking pieces of cobs or other hard substances, so as to permit them and the grain to be crushed with sufficient fineness to escape between the disks. This construction prevents the machine being choked by pieces of cobs, and insures the machine being run without danger of injury to the grinding-surfaces.

Each disk or plate C is provided with a lug $d$, and these lugs are bolted to the lower ends of a $\wedge$-shaped frame G, whose upper end is connected with the reciprocating rod F or other moving part of a windmill, or it may be secured to any other device which would impart a reciprocating movement to it. As the lugs $d$, when the disks are in operative position, are diagonally arranged with relation to each other, and as the arms of the frame G are more or less springy, it will be manifest that as the frame G is reciprocated its lower ends, which are connected to the lugs $d$, which lie in planes to one side of the vertical centers of the disks will cause these disks to be oscillated in opposite directions during the upward and downward stroke of the frame G. We therefore obtain a continuous grinding action, which is preferred to intermittent action produced by other machines and especially those employing grinding disks or surfaces one of which is stationary and the other movable. In addition to this advantage, the machine runs very smoothly, is not liable to get out of order, and its capacity is greatly increased, while the securing of the grinding-rings to the disks by bolts permits them to be readily removed when broken or worn and replaced with new ones. The shaft B, upon which the disks are mounted, is threaded at one end to receive a hand-wheel H, whose sleeve bears against the thin sides of the frame A, so that said side may be forced inward and caused to bear against the adjacent disk C or against an interposed washer, whereby said disk may be adjusted toward or from the opposite disk to increase or decrease the distance between the grinding-faces, thus regulating the fineness of the ground substance.

If desired, I may employ a double grinding-ring L (see Figs. 4 and 6) in addition to those previously described, and when this is done this double ring will be mounted on the shaft between the two grinding-rings C, and will have its opposite faces furrowed and provided with lugs $b$, similar to those on the disks C, and for like purposes. When using this double ring, holes $g$ will be formed through it to form a passage for the grain where the feed is from one side only. The shaft B may also be provided with a "break-pin" J, which fits in a groove J' in a washer J'', and will be ruptured at a predetermined pressure to save the grinding-surfaces from injury that would result from the presence between them of a piece of stone, iron, or other hard or refractory substance. Thus it will be seen that when the sides of the frame are drawn inward by the hand-wheel engaging the shaft and a hard substance finds its way between the grinding-disks, the said disks are forced apart with sufficient power to cause the sides of the frame to press against the washer J″ and rupture the pin J, thereby relieving the disks of the strain upon them.

Having thus described our invention, what we claim as new, and desire to secure by Letters Patent, is—

1. In a grinding-mill having a main frame, a shaft, and grinding rings or disks mounted thereon, a reciprocating frame having spring-arms secured to opposite rings or disks, whereby oppositely-reciprocating movements are imparted to the grinding rings or disks during the reciprocations of said frame, substantially as herein described.

2. In a grinding-mill having a main frame, a shaft, and grinding rings or disks provided with breaking-lugs, a hopper for feeding material through an opening in one of said disks, and a reciprocating ∧-shaped frame having its arms elastic and connected with opposite grinding-disks, whereby the latter are oscillated in reverse directions, substantially as herein described.

3. The combination, with a frame, a shaft mounted therein, a plurality of disks loose upon the shaft and having feed-apertures in their sides, of grinding-rings bolted to said disks and provided with furrowed faces and breaking-lugs, means for adjusting the distance between the grinding-faces, and a frame having spring-arms connected with lugs on the disks, whereby said disks are oscillated in opposite directions, substantially as described.

4. In a grinding-mill having oppositely-oscillating grinding-disks, a shaft upon which said disks are mounted having one end threaded, a main frame having elastic sides, a hand-wheel on the threaded end of the shaft and bearing against the side of the main frame, a grooved washer on said shaft at the opposite side, and a break-pin in said shaft fitting a groove in the washer, substantially as herein described.

DAVID R. GREEN.
FRANK R. FISHER.

Witnesses:
J. M. WALKER,
J. K. SWEENEY.